United States Patent [19]

Bertolini

[11] 4,352,517
[45] Oct. 5, 1982

[54] FRONT LOCKING PIN FOR GOOSENECK CONTAINER CHASSIS

[76] Inventor: William A. Bertolini, 115-65 Undercliff Ter., Kinnelon, N.J. 07405

[21] Appl. No.: 205,590

[22] Filed: Nov. 10, 1980

[51] Int. Cl.³ .............................................. B62D 23/00
[52] U.S. Cl. .................................... 296/35.3; 410/76; 410/81
[58] Field of Search ................. 296/35.1, 35.3; 410/76, 410/77, 80, 81, 82; 224/315, 324; 292/140, 142

[56] References Cited

U.S. PATENT DOCUMENTS

| 616,877 | 1/1899 | Baldry | 292/142 |
| 3,719,385 | 3/1973 | Carr | 410/77 |
| 4,266,820 | 5/1981 | Whaley | 296/35.3 |

FOREIGN PATENT DOCUMENTS 441484  1/1936  United Kingdom ................ 292/142

Primary Examiner—Joseph F. Peters, Jr.
Assistant Examiner—John A. Carroll
Attorney, Agent, or Firm—Max R. Millman

[57] ABSTRACT

A pin construction for locking the front corner castings of a standard container to a conventional gooseneck chassis in which the pin is provided with a gear rack, a spur gear quadrant is mounted for rotation to and in the front bolster of the chassis which engages the gear rack, a handle to rotate the spur gear and a latch mechanism associated with the handle whereby in-line thrust of the pin is obtained to obviate binding, the mechanism being relatively simple, maintenance-free and encased in the bolster to preclude damage to the pin and handle.

7 Claims, 7 Drawing Figures

FRONT LOCKING PIN FOR GOOSENECK CONTAINER CHASSIS

This invention relates to a pin construction for locking the front end of a standard container on a conventional gooseneck chassis to secure the container against movement relative to the chassis.

The primary object of the invention is to provide a locking pin employing rack and pinion activation to obtain an in-line thrust rather than rotation of the pin as required in most current mechanisms in which binding generally occurs because their handles are offset from the thrust of the pin and have often required jiggling to advance the pin fully outwardly to its locking position.

Another object of the invention is to provide a front locking pin mechanism in which the pin includes a gear rack, a handle including a spur gear quadrant activating the gear rack and a latch associated with the handle which mechanism is simple, relatively maintenance-free and totally encased within the vertical projection of the front bolster of the chassis, thus precluding damage due to pins or handles extending out of the chassis in either the open or closed position of the pin.

Another object of the invention is to provide a rack and pinion activated locking pin which is neither left nor right and, hence, the pins and handles can be used interchangeably on both sides of the chassis.

Another object of the invention is to provide a rack and pinion activated locking pin in which the sides of the pin are milled so that the shape of the pin and the oval shape of the aperture in the corner casting of a standard container substantially coincide, thereby permitting ease of entry of the pin in the aperture and yet maintain proper strength of the pin in the vertical direction as there is virtually no lateral load on the pin because of chassis gooseneck and container tunnel mating.

The foregoing objects are obtained by providing a gear rack in the rear end portion of the pin, a spur gear engaging the gear rack including a hub mounted for rotation to and in the chassis bolster, a handle extending from the hub and a latch pivoted on the handle including end forks engageable in the hub and in a portion of the bolster supporting the handle.

These and other objects of the invention will become more apparent as the following description proceeds in conjunction with the drawings, wherein.

Specific reference is now made to the drawings in which similar reference characters are used for corresponding elements throughout.

Figure 1:
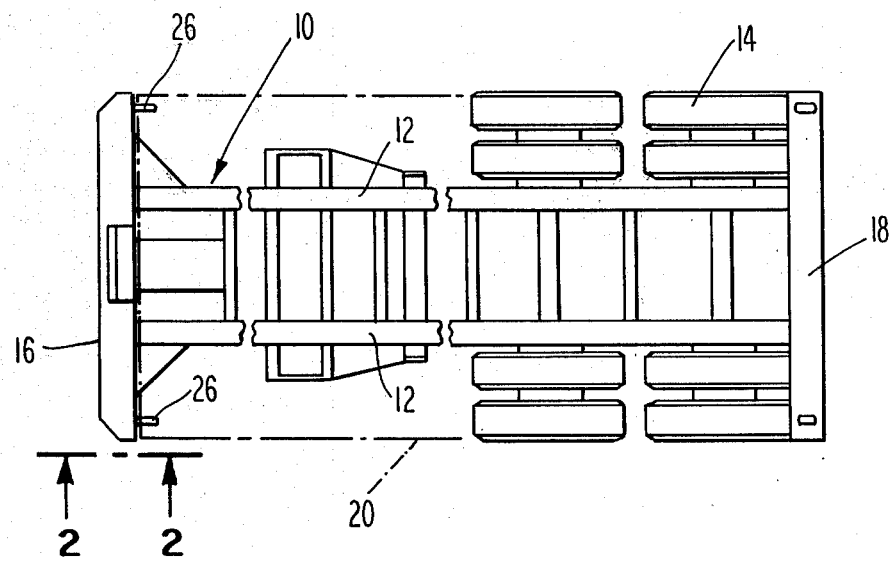
FIG. 1 is a top plan diagrammatic view of a conventional gooseneck chassis with the instant locking pin mechanisms in place in the front bolster and the container shown in phantom.
Figure 2:
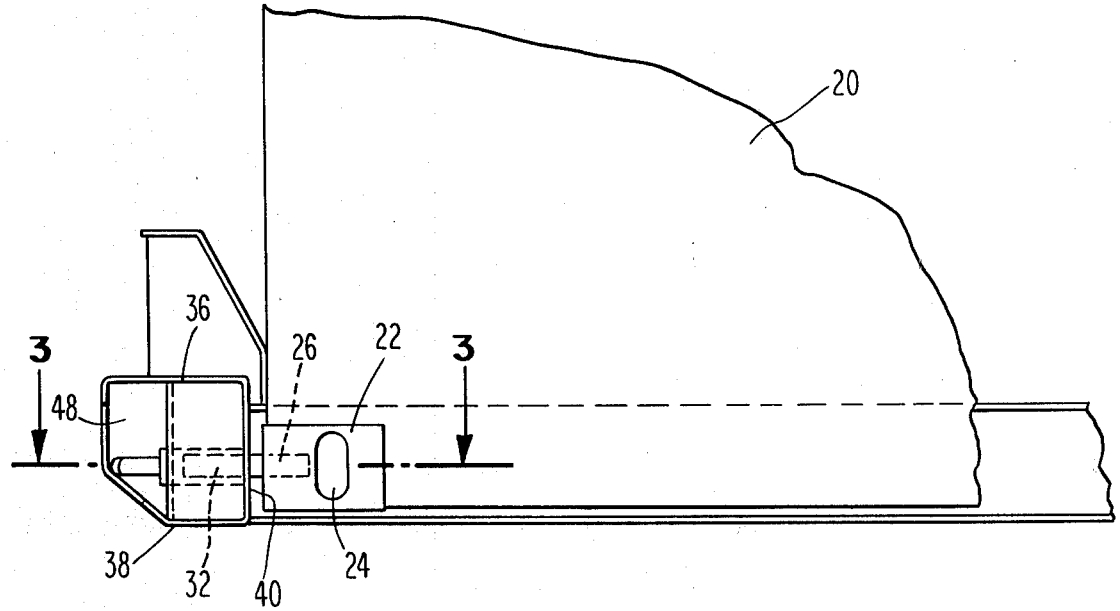
FIG. 2 is an enlarged side view taken from the line 2—2 of FIG. 1.

Indicated generally at 10 is a conventional gooseneck chassis comprising spaced longitudinal rails 12 and supporting tandem axle wheel-sets 14 and front and rear transverse bolsters 16 and 18. A standard container 20 having corner members or castings 22 with oval apertures 24 is adapted to be mounted on the chassis and held in place by front and rear locking pins. The usual rear locking pin is a twist lock of the type shown, for example, in my U.S. Pat. No. 3,737,135 and is not the subject of this invention. This invention relates to the front locking pin mechanism associated with the front bolster 16 and adapted to selectively extend into and retract from the end oval aperture 24 in each of the lower container corner members 22 as shown more specifically in FIGS. 2 and 3.

The present locking mechanism operates by in-line thrust rather than by rotary motion, currently in widespread use, which causes binding. An elongated metal pin 26, preferably steel, is provided having an outer smooth portion 28 for about half the overall length of the pin whose sides are milled as at 30 so that its cross-section will substantially correspond to the oval cross-section of the container corner aperture 24. The cross-sectional area of the pin portion 28 relative to the container corner aperture 24 is such that if the container on the chassis should shift from side to side, the tunnel of the container bears against the chassis rails 12 rather than the corner members 20 bearing against the pins 26. The inner portion 32 which extends for the remaining length of the pin is provided with a gear rack consisting of gear teeth 34 cut into the pin and extending generally axially thereof.

The rear bolster 16 comprises a top wall 36, a bottom wall 38 and an inner side wall 40 facing to the rear of the chassis. Extending downwardly from an edge of the top wall 36 and upwardly from an edge of the bottom wall 38 are angled flanges 42 and 44 respectively so that the outer portion of the bolster opposite the inner side wall 40, that is, the portion facing forwardly of the chassis, is open and accessible as at 46. The bolster also includes recessed end walls 48.

A tubular bearing 50 is provided for the pin 26 of circular cross-section and internal diameter corresponding to the diameter of the toothed inner portion 32 of the pin. The bearing is welded as at 52 to the side wall 40, communicates with an opening 53 in the wall 40 and extends inwardly of the bolster and towards the front thereof. To support the front of the bearing, a vertical L-shaped plate 54, preferably integral with the end wall 48, is welded to the top and bottom bolster walls 36 and 38 as at 56. The laterally extending portion 58 of the plate 54 includes a semi-circular portion which is welded as at 60 to the pin bearing 50. The bearing 50 is milled at an angle 62 to form a clearance 64 for a purpose soon to appear.

Welded as at 66 to the bottom wall 38 is a vertical plate 68 which is also welded as at 72 to the side wall 40. Formed with the vertical plate 68 as at 74 is a horizontal plate 76 which is also welded as at 78 to the side wall 40 of the bolster. The horizontal wall 76 is provided with a hole 80 through which extends a boss 82.

A spur gear quadrant 84 is provided having teeth 86 which engage the teeth 34 of the gear rack of the pin. The quadrant includes a portion or hub 88 and a handle 90 which is secured to or integral with the hub. The boss 82 extends from the quadrant hub 88 and a headed bolt 92 extends through the hub 88 and is secured thereto by a nut 94 at the threaded end 96 of the bolt and tightened up by an oversized washer 98. Thus, the gear quadrant is rotatable on the horizontal plate 76. The quadrant and boss 82 rotate around hole 80. The boss 82 is slightly larger than the thickness of the plate 76 so that the nut 94 when tightened has the washer 98 bear on the boss whereby the whole assembly can rotate in hole 80. This eliminates from the in-service maintenance man and assembler in the factory the problem of providing the right tension on the bolt. The bolt can be clamped as tight as possible without adversely effecting the rotational ability of the handle.

A latch 100 is provided in the form of a bar 101, one end 102 of which contains inwardly bent hooks or forks 104 and 106. The hub 88 has slots 108 and 110 and the plate 76 which supports the handle 90 and hub 88 also contains two slots 112. The latch is pivoted intermediate its ends as at 114 to the handle and a spring 116 is interposed between that portion of the latch opposite its hooks, this spring normally urging the hooks into engagement with the hub slots 108 and 110 and the handle support slots 112. It will be seen that the spur gear quadrant handle and latch extend generally longitudinally of the bolster whereas the locking pin extends transversely thereof.

Figure 3:
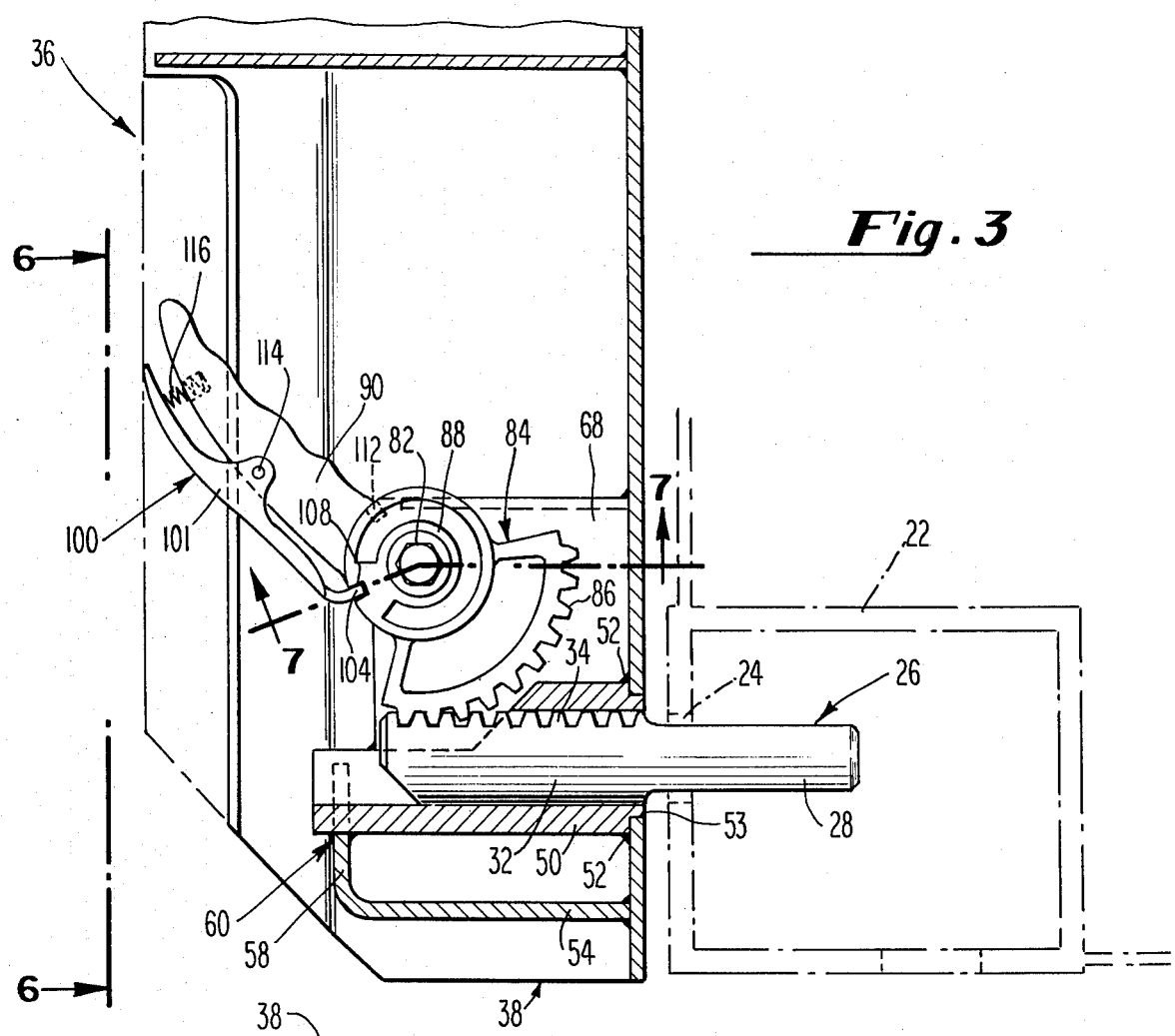
FIG. 3 is an enlarged sectional view taken on the line 3—3 of FIG. 2 showing the pin in its extended locking position.
Figure 4:
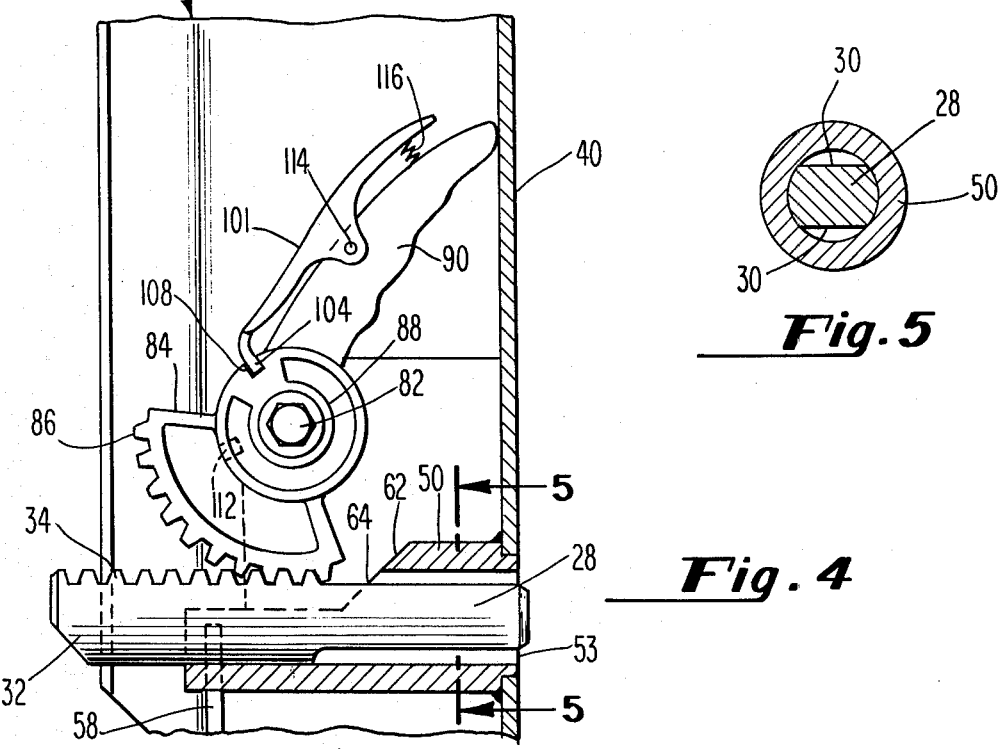
FIG. 4 is a view similar to FIG. 3 showing the pin in its retracted unlocked position.
Figure 5:
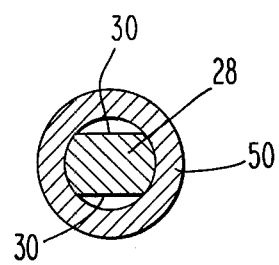
FIG. 5 is a sectional view taken on the line 5—5 of FIG. 4.
Figure 6:
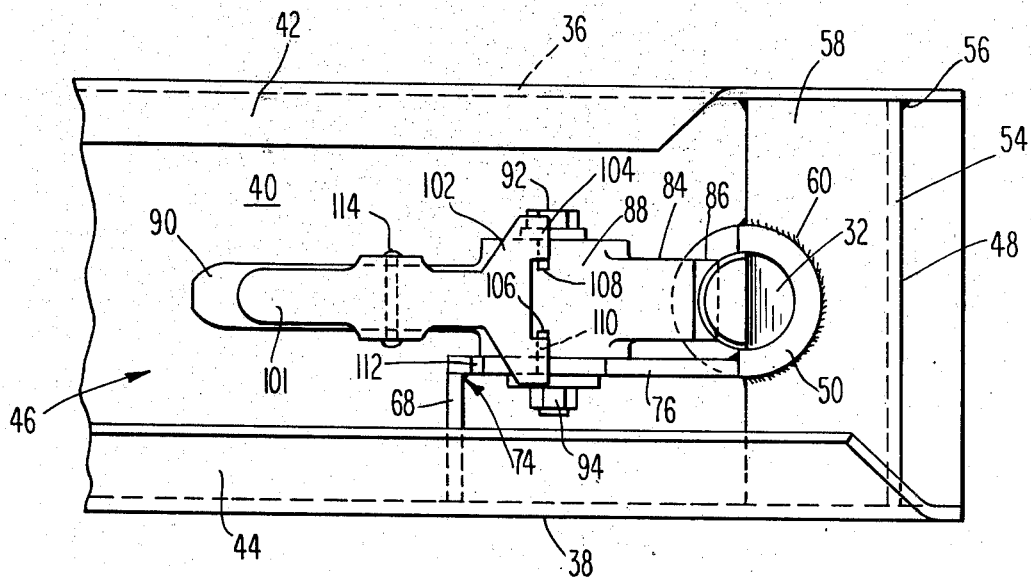
FIG. 6 is an elevational view looking to the rear of the chassis from the line 6—6 on FIG. 3.
Figure 7:
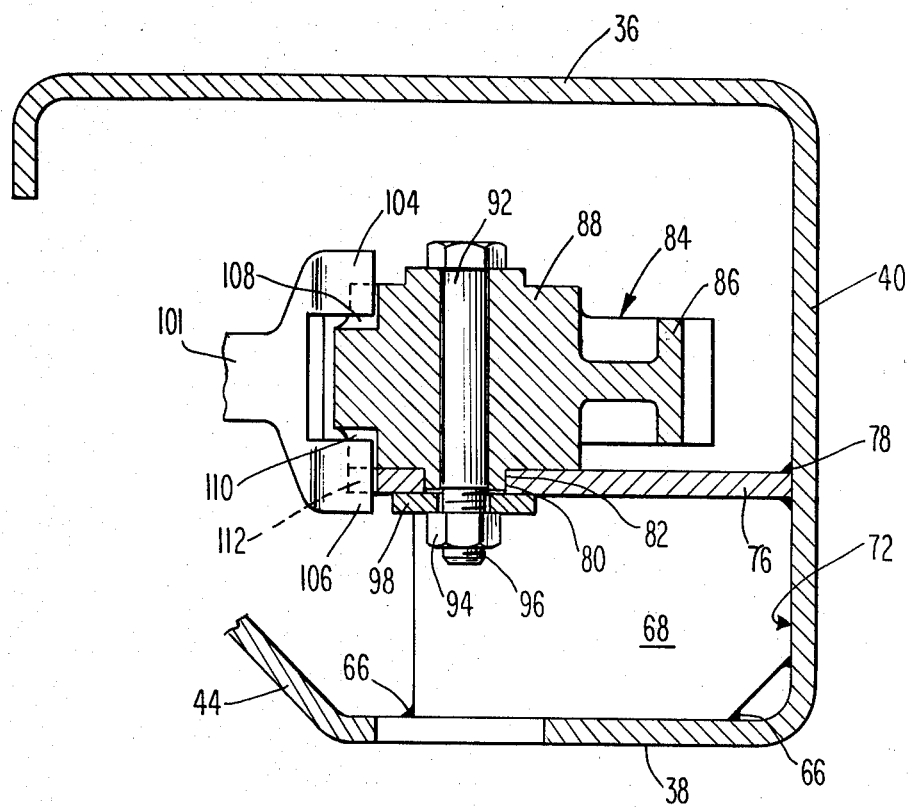
FIG. 7 is a sectional view taken on the line 7—7 of FIG. 3.

In operation, starting with the retracted position of the pin shown in FIG. 4, when the latch 100 is depressed against action of its spring 116 until its end hooks are retracted from the hub slots 108 and 110 and the handle support slot 112, the handle is rotated towards the front of the bolster whereupon the spur gear teeth engaging the rack teeth move the pin 26, by in-line thrust, through the aperture 53 of the bolster wall 40, through the oval aperture 24 and into corner container casting 22 in the locking position as shown in FIG. 3. When the latch is released, the hook ends 104 and 106 re-enter the hub slots 108 and 110 and the lower hook end 106 enters the slot 112 in the handle support 76. The reverse operation is performed to retract the pin into the unlocked position as shown in FIG. 4. It will be noted that in both the locking and retracted positions of the pin, the handle and its associated latch remain within the confines of the bolster.

It will be understood that two such locking pin mechanisms will be mounted within the bolster to enter into the lower corner members of the container in the locking position and to be retracted therefrom in the unlocked position. While the locking pin mechanism is at the left side of the handle and the left side of the front bolster, the locking pin can be used on either side of the chassis by merely turning over the handle and slipping the two hooks into the hub and support plate slots. In this position a shear condition prevents the handle from moving without depressing the latch.

What is claimed is:

1. In a chassis having a front transverse bolster including a rear wall, top and bottom walls, an open front and apertures in the rear wall; a locking pin mechanism adjacent each bolster aperture comprising a pin mounted for movement transversely of and in the bolster, a rack of gear teeth longitudinally along the pin at the front portion thereof, a spur gear quadrant having teeth engaging the rack teeth, a handle extending generally horizontally from the spur gear quadrant and means mounting the spur gear quadrant for rotation transversely of and in the bolster to selectively activate the pin and extend it into its locking position through the bolster aperture and into a lower corner member of a container on the chassis and to retract the pin out of the corner member in the unlocked position, and a releasable latch to selectively latch the spur gear quadrant against rotation and to unlatch the spur gear quadrant to permit its rotation by the handle, said spur gear quadrant, handle and mounting means being within the confines of the bolster in both the extended and retracted position of said locking pin.

2. The invention of claim 1 wherein the spur gear quadrant includes a hub from which the handle extends and a member in the bolster supporting the means rotationally mounting the spur gear quandrant.

3. The invention of claim 2 wherein said releasable latch includes at least one slot in the hub and a further slot in the support member, a latch bar pivoted intermediate its ends to the handle and including an end hook, and spring means urging the end hook into engagement in the slots to latch the spur gear quadrant against rotation, whereby depression of the latch bar against action of the spring means will remove the hook from the slots and allow the handle to rotate the spur gear quadrant to selectively effect extension and retraction of the locking pin.

4. The invention of claim 3 wherein two slots are provided in the hub and one in the support member and the latch bar includes two spaced end hooks, the spring means urging the two end hooks into the hub slots and one of the end hooks also into the support member slot.

5. The invention of claim 1 and a bearing secured to the bolster inwardly thereof through which the pin slides, a portion of the bearing being cut off at an angle to allow clearance of the spur gear quadrant within the bolster.

6. In a chassis having a front transverse bolster including a rear wall, top and bottom walls, an open front and apertures in the rear wall; a locking pin mechanism adjacent each bolster aperture comprising a pin, a bearing secured in the bolster communicating with the bolster aperture and slidably mounting the pin, a gear rack having teeth in the front portion of the pin and extending longitudinally thereof, a spur gear quadrant having teeth engaging the gear rack teeth, a support member secured in the bolster, means mounting the spur gear quadrant for rotation on the support member, a handle extending from the spur gear quadrant, a latch bar pivoted intermediate its ends to the handle, at least one hook at the end of the latch bar, a slot in a portion of the spur gear quadrant and a slot in the support member and spring means urging the end hook into the slots to latch the spur gear quadrant against rotation and, when the latch bar is depressed against action of the spring to remove the end hook from the slots, rotation of the spur gear quadrant by the handle in one direction will act to extend the pin through the bolster aperture into a locking position and rotation in the opposite direction will retract the locking pin, the spur gear quadrant, handle and latch all being confined within the bolster in both the locking and retracted positions of the pin.

7. The invention of claim 6 wherein the pin bearing is cut away at a predetermined area to allow clearance for the spur gear quadrant in the bolster.

* * * * *